US009611826B2

(12) United States Patent
Monros (10) Patent No.: US 9,611,826 B2
(45) Date of Patent: Apr. 4, 2017

(54) PLASMA HEADER GASKET AND SYSTEM (71) Applicant: SVMTech, LLC, Costa Mesa, CA (US)

(72) Inventor: Serge V. Monros, Costa Mesa, CA (US)

(73) Assignee: SVMTech, LLC, Costa Mesa, CA (US)

(*) Notice: Subject to any disclaimer, the term of this patent is extended or adjusted under 35 U.S.C. 154(b) by 0 days.

(21) Appl. No.: 15/236,674

(22) Filed: Aug. 15, 2016

(65) Prior Publication Data

US 2016/0348635 A1 Dec. 1, 2016

Related U.S. Application Data (63) Continuation-in-part of application No. 14/876,618, filed on Oct. 6, 2015, which is a continuation-in-part of application No. 14/515,332, filed on Oct. 15, 2014, now Pat. No. 9,236,714, application No. 15/236,674, which is a continuation-in-part of application No. 13/858,733, filed on Apr. 8, 2013.

(60) Provisional application No. 61/891,551, filed on Oct. 16, 2013.

(51) Int. Cl.
H01T 21/02 (2006.01)
F02P 13/00 (2006.01)
F02P 9/00 (2006.01)
F02P 23/04 (2006.01)
F02F 11/00 (2006.01)
F02P 7/03 (2006.01)
H01T 13/28 (2006.01)
H01T 13/50 (2006.01)
H01T 15/00 (2006.01)
H05H 1/52 (2006.01)
F02P 3/01 (2006.01)

(52) U.S. Cl.
CPC ............. *F02P 13/00* (2013.01); *F02F 11/002* (2013.01); *F02P 7/03* (2013.01); *F02P 9/007* (2013.01); *F02P 23/04* (2013.01); *H01T 13/28* (2013.01); *H01T 13/50* (2013.01); *H01T 15/00* (2013.01); *H05H 1/52* (2013.01); *F02P 3/01* (2013.01)

(58) Field of Classification Search
CPC .... F02P 13/00; F02P 7/03; F02P 9/007; F02P 23/04; F02P 11/002; F02P 3/01; H05H 1/52; H01T 13/28; H01T 13/50; H01T 15/00
See application file for complete search history.

(56) References Cited

U.S. PATENT DOCUMENTS

| 2,775,234 | A | 12/1956 | Smits |
| 3,854,067 | A | 12/1974 | Morgan |
| 4,436,068 | A | 3/1984 | Nakamura et al. |
| 4,455,989 | A | 6/1984 | Endo et al. |
| 4,623,250 | A | 11/1986 | Onishi et al. |
| 4,947,680 | A | 8/1990 | McDougal |
| 5,046,466 | A | 9/1991 | Lipski |
| 5,074,262 | A | 12/1991 | McAbee et al. |
| 5,380,014 | A | 1/1995 | Schaperkotter |
| 5,659,132 | A | 8/1997 | Novak et al. |
| 5,704,321 | A | 1/1998 | Suckewer et al. |
| 6,161,520 | A | 12/2000 | Clarke |
| 6,435,153 | B1 | 8/2002 | McAliece et al. |

(Continued)

Primary Examiner — Tracie Y Green
(74) Attorney, Agent, or Firm — Kelly & Kelley, LLP (57) ABSTRACT A plasma header gasket for use with an internal combustion engine includes plasma-igniters disposed around the perimeter of apertures in the gasket corresponding to piston cylinders in the engine. The plasma-igniters produce a plasma ionization field in time with the engine to increase the efficiency of combustion.

20 Claims, 5 Drawing Sheets (56) References Cited

U.S. PATENT DOCUMENTS

| | | |
|---|---|---|
| 6,670,740 B2 | 12/2003 | Landon, Jr. |
| 6,807,933 B2 | 10/2004 | Lipski |
| 7,299,785 B1 | 11/2007 | Lee |
| 7,441,540 B1 | 10/2008 | Minami |
| 7,661,402 B2 | 2/2010 | Minami |
| 8,602,005 B2 | 12/2013 | Ikeda |
| 9,236,714 B2 | 1/2016 | Monros et al. |
| 2005/0194877 A1 | 9/2005 | Horn et al. |
| 2010/0180873 A1 | 7/2010 | Kobayashi |
| 2010/0319656 A1 | 12/2010 | Clarke |
| 2011/0001294 A1 | 1/2011 | Ikeda |
| 2013/0193834 A1 | 8/2013 | Hill |

PLASMA HEADER GASKET AND SYSTEM

RELATED APPLICATIONS

This application is a continuation-in-part of U.S. patent application Ser. No. 14/876,618, filed Oct. 6, 2015, which is a continuation of U.S. patent application Ser. No. 14/515,332, filed Oct. 15, 2014 (now U.S. Pat. No. 9,236,714), which claimed priority to U.S. Application No. 61/891,551, filed Oct. 16, 2013. This application is also a continuation-in-part of U.S. application Ser. No. 13/858,733, which was filed Apr. 8, 2013.

BACKGROUND OF THE INVENTION

The present invention generally relates to a gasket for use between an engine block and engine header. The gasket includes electrodes disposed in the openings corresponding to piston cylinders. The electrodes spark in time with the other ignition parameters, i.e., spark plug or compression, to increase the efficiency of the combustion.

The basic operation of standard internal combustion (IC) engines varies somewhat based on the type of fuel or combustion process, the quantity of cylinders and the desired use/functionality. Certain types of fuel, such as gasoline, require a spark as from a spark plug to initiate combustion. Other types of fuel, such as diesel, require merely compression to raise the temperature of the air, which results in spontaneous combustion of the diesel when introduced. Diesel engines include glow-plugs to add heat and initiate combustion in a cold diesel engine. Engines may also be designed to use alternative fuels, such as biodiesel, liquid natural gas, liquefied petroleum gas, compressed natural gas and ethanol, to name a few. Combustion of all of these types of fuel usually leaves some residual, uncombusted fuel and other components after combustion.

In a traditional two-stroke engine, oil is pre-mixed with fuel and air before entry into the crankcase. The oil/fuel/air mixture is drawn into the crankcase by a vacuum created by the piston during intake. The oil/fuel mixture provides lubrication for the cylinder walls, crankshaft and connecting rod bearings in the crankcase. The fuel is then compressed and ignited by a spark plug that causes the fuel to burn. The piston is then pushed downwardly and the exhaust fumes are allowed to exit the cylinder when the piston exposes the exhaust port. The movement of the piston pressurizes the remaining oil/fuel in the crankcase and allows additional fresh oil/fuel/air to rush into the cylinder, thereby simultaneously pushing the remaining exhaust out the exhaust port. Momentum drives the piston back into the compression stroke as the process repeats itself. In a four-stroke engine, oil lubrication of the crankshaft and connecting rod bearings is separate from the fuel/air mixture. Here, the crankcase is filled mainly with air and oil. It is the intake manifold that receives and mixes fuel and air from separate sources. The fuel/air mixture in the intake manifold is drawn into the combustion chamber where it is ignited by the spark plugs and burned. Both types of engines employ a spark to combust the fuel and both leave residual, uncombusted fuel and other components in the combustion chamber.

Thus, there exists a significant need for an improved ignition system to increase the efficiency of combustion in most types of engines burning most types of fuels. Such an ignition system would ideally work in tandem with existing prior art ignition systems for retrofit designs, as well as, be available for original equipment manufacturers as a stand-alone system. The improved ignition system should include a plasma header gasket disposable between the engine and header blocks of an internal combustion engine, and having igniters presenting electrodes disposed in the piston cylinder apertures of the gasket. A microprocessor control unit and plasma amplifier augment the ignition typically generated by a prior art ignition system to produce a plasma ionization field—the plasma ionization field producing over 200 Amps per discharge. The present invention fulfills these needs and provides further related advantages.

SUMMARY OF THE INVENTION

The present invention is directed to a plasma header gasket configured for placement between an engine block and a header block of an internal combustion engine, similar to a prior art header gasket. The plasma header gasket comprises a laminated substrate having an aperture corresponding to a piston cylinder in an engine block of an internal combustion engine, similar to a prior art header gasket. A pair of Thorium-alloy conductors are associated with the substrate and are electrically connected to a switched plasma-igniter. The switched plasma-igniter comprises a plasma-amplifier electrode disposed in the aperture, the plasma-amplifier electrode comprising a half-sphere conductor surrounded by an electrically isolated toroidal plasma-emitter ring defining a plasma gap therebetween. Different types of conductive coatings may be applied to the half-sphere conductor and the toroidal plasma-emitter ring, such as platinum, stainless steel, other noble metals, and alloys thereof.

The substrate comprises dielectric layers with the pair of Thorium-alloy conductors being electrically conductive Thorium-alloy circuit traces disposed between the dielectric layers. The Thorium-alloy conductors more freely contribute free electrons to the connecting circuit than typical conductors. A switching block is preferably disposed on the substrate and electrically connected to the pair of Thorium-alloy conductors. The Thorium-alloy circuit traces electrically connect the switched plasma-igniter to the switching block. The plasma header gasket also includes a plasma field sensor associated with the aperture and electrically connected to the switching block by a secondary conductor associated with the substrate.

The plasma header gasket may comprise a plurality of pairs of Thorium-alloy conductors associated with the substrate and electrically connected to the switching block. The plasma header gasket may also comprise a plurality of switched plasma-igniters, each electrically connected to one of the plurality of pairs of Thorium-alloy conductors. Each of the plurality of switched plasma-igniters comprises a plasma-amplifier electrode disposed in the aperture, the plasma-amplifier electrode comprising a half-sphere conductor surrounded by an electrically isolated toroidal plasma-emitter ring defining a plasma gap therebetween.

The laminated substrate may have a plurality of apertures with each aperture corresponding to one of a plurality of piston cylinders in the engine block. With a plurality of apertures and a plurality of switched-plasma igniters, each of the plurality of switched plasma-igniters comprises a plasma-amplifier electrode disposed in one of the plurality of apertures, the plasma-amplifier electrode comprising a half-sphere conductor surrounded by an electrically isolated toroidal plasma-emitter ring defining a plasma gap therebetween. In such case, each of the plurality of switched plasma-igniters is conjointly electrically connected to a respective one of the plurality of pairs of Thorium-alloy conductors.

A plasma header gasket system of the present invention may comprise a plasma header gasket as described above and further include a fully programmable microprocessor control unit electrically connected to the switching block. The microprocessor control unit is fully programmable to ignite the switched plasma-igniter in time with a piston in the piston cylinder. The switched plasma-igniter comprises a plasma-amplifier electrode, which electrode is controllable by the microprocessor control unit. The plasma-amplifier electrode produces a plasma ionization field through the switched plasma-igniter when the microprocessor control unit ignites the switched plasma-igniter. The microprocessor control unit may be programmed to ignite the plurality of switched plasma-igniters sequentially around a particular aperture so as to create a combustion vortex in the corresponding piston cylinder.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
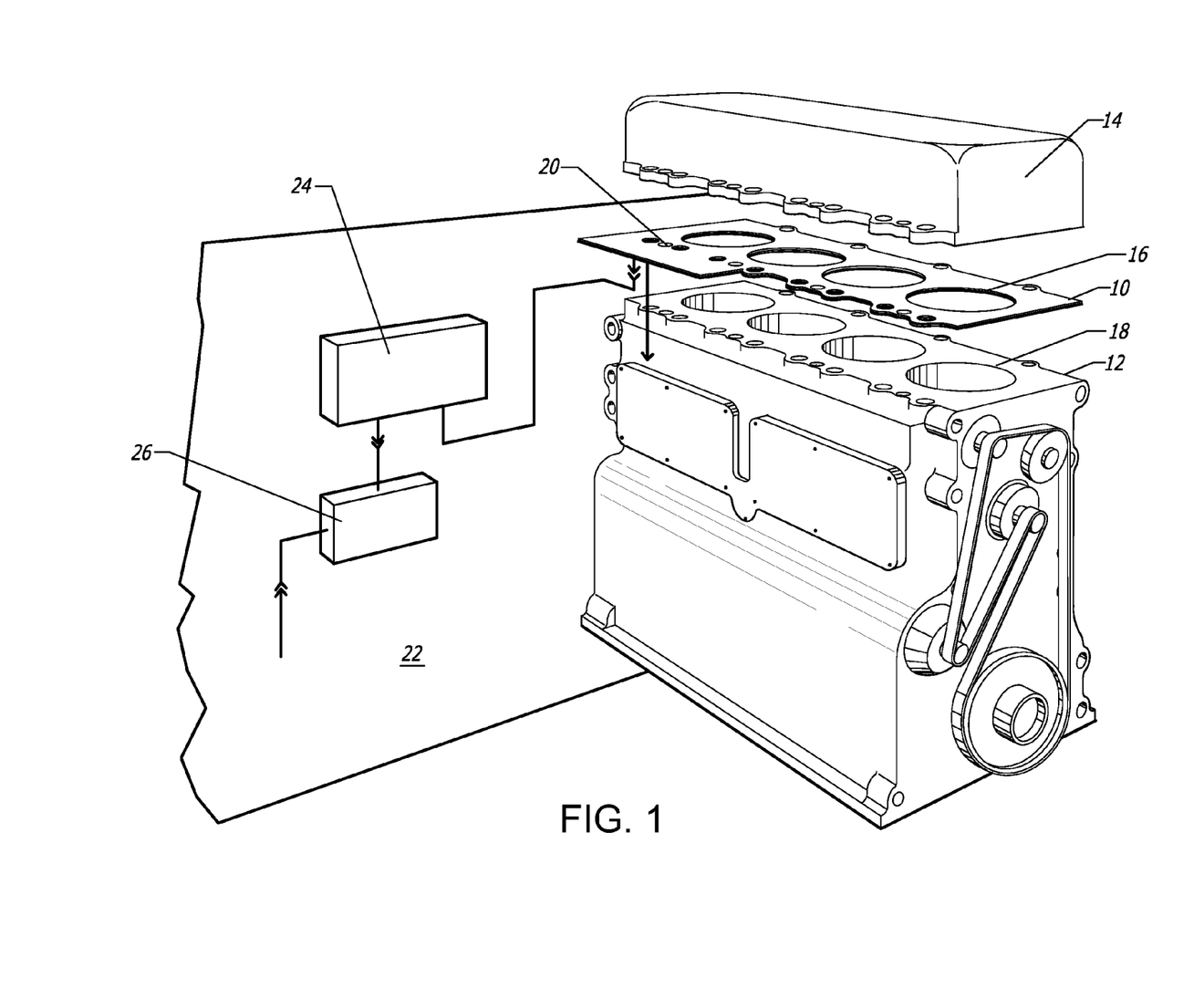
FIG. 1 is an environmental, exploded perspective view of an internal combustion engine incorporating the inventive plasma header gasket.

As shown in the drawings for purposes of illustration, the present invention for a plasma header gasket is referred to generally by the reference number 10. In FIG. 1, the plasma header gasket 10 is illustrated as being disposed between an engine block 12 and engine header 14. The plasma header gasket 10 may include four apertures 16 that correspond to four piston cylinders 18 in the engine block 12. Although not depicted, there are corresponding header cylinders in the engine header 14, as is understood by those skilled in the art. The plasma header gasket 10 also includes a plurality of bolt openings 20 to accommodate connectors (not shown) that secure the engine header 14 to the engine block 12.

FIG. 1 also illustrates a firewall 22 as exists between an engine compartment and a passenger compartment on a vehicle. A microprocessor control unit 24 is preferably mounted on the firewall 22 and electrically connected to the plasma header gasket 10. An ignition coil 26 is also included in the engine compartment and is electrically connected to the microprocessor control unit 24. The interconnection of these components will be described in more detail below.

The engine depicted in FIG. 1 is intended to depict a typical diesel engine. However, the plasma header gasket 10 of the present invention may be compatible with other types of internal combustion engines, whether two-stroke or four-stroke engines, or burning alternate fuels, i.e., gasoline, diesel, biodiesel, liquid natural gas, liquefied petroleum gas, compressed natural gas, or ethanol, to name a few. The ionization associated with a plasma ignition is preferable to the spark associated with a spark ignition because of the magnitude of increase in power associated therewith.

Figures 2, 3:
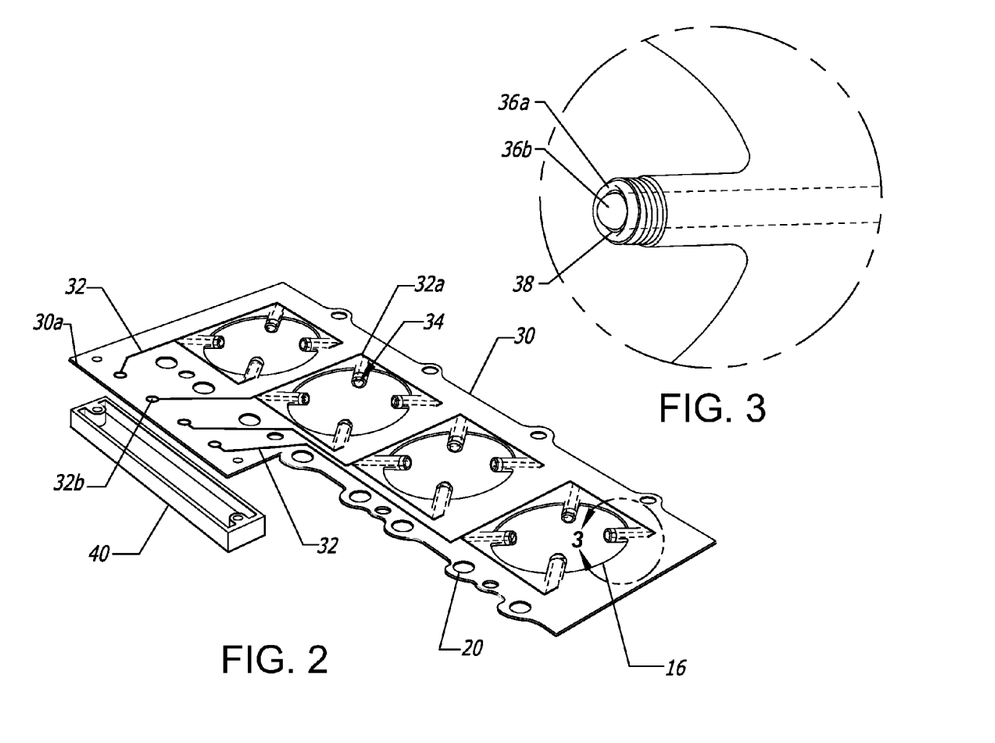
FIG. 2 is an exploded perspective view of the plasma header gasket of the present invention.
FIG. 3 is a close-up view of FIG. 2 designated by the circle 3.

FIGS. 2 and 3 illustrate the plasma header gasket 10 of the present invention. The plasma header gasket 10 is a laminated structure comprising at least an upper laminate 28 and a lower laminate 30. Pairs of conductors 32 are disposed on either the upper laminate 28 or the lower laminate 30. These pairs of conductors 32 are configured to provide positive and negative electrical communication paths as are found in typical electrical connections. The pairs of conductors 32 comprise Thorium-alloy circuit traces disposed on the laminate 28, 30. The Thorium-alloy may comprise any known alloy of Thorium, but is preferably a Thorium-Tungsten alloy—or a Tungsten conductor coated in Thorium. The Thorium-alloy conductors 32 more freely contribute free electrons to the connecting circuit than typical conductors.

Thorium is useful as an alloy in devices that propagate finely controlled electronic systems because the 232 isotope of Thorium continuously emits free electrons ($6.02 \times 10^{17}$ per square cm/sec) without also exhibiting the release of any of the other emission products associated with nuclear decay. In the inventive plasma header gasket, the free electrons supplied by the Thorium-alloy significantly increase the amount of actual electron output by the device. This amplifying feature renders the current invention functionally superior to any known devices of similar construction or application. The Thorium-alloyed conductors allow for super-fast switching with exceptionally low resistance. The material allows for free electron field saturation with virtually zero residual charge persistence.

One end 32a of the pairs of Thorium-alloy conductors 32 is connected to a switched plasma-igniter 34 disposed in an aperture 16. As shown in the close-up of FIG. 3, the switched plasma-igniter 34 comprises a plasma-amplifier electrode 36 disposed in the aperture 16—extending from the perimeter. The plasma-amplifier electrode 36 comprises a half-sphere conductor 36a surrounded by an electrically isolated toroidal plasma-emitter ring 36b defining a plasma gap 38 therebetween. The other end 32b of the pair of Thorium-alloy conductors 32 extend to an edge portion 30a of the laminate 30 where they are coupled to a switching block 40. The switching block 40 facilitates connection of the plasma header gasket 10 to other components of the plasma header gasket system described more fully below. The structure of the switched plasma igniter 34 is similar to that described in U.S. Pat. No. 9,236,714, the entire disclosure of which is herein incorporated by this reference.

The configuration of the plasma gap 38 defined by the half-sphere conductor 36a and the plasma emitter ring 36b optimizes the relationship between both the geometric and surface area components. The plasma gap 38 is preferably on the order of approximately 0.030 inches. The distal end of the half-sphere conductor 36a preferably protrudes beyond the end of the plasma emitter ring 36b by approximately 0.020 inches. The insulator 14 between the half-sphere conductor 36a and the plasma emitter ring 36b is situated within 0.030 inches of the exposed surface of the ring 36b. This combination of materials, along with curved geometric sections and a closely-fixed insulator floor provides a conductive surface area which is at least twenty-five times greater than prior art high performance racing-type spark ignitors as might be found in NASCAR engines. In addition, this configuration of the plasma amplifier electrode 36 forces the plasma ionization field into the piston chamber towards the head of the piston. The combination of increased surface area of such plasma devices has been shown to improve combustion effectiveness and efficiency by more than 68% when compared to prior art high performance spark plugs in identical test applications under typical 4-cycle gasoline burning internal combustion engine systems.

In combination, the switching block 40 and the microprocessor control unit 22 are configured to provide high-speed, digitally controlled switching of the electricity to the plasma-amplifier electrode 36. The electricity may be provided by a transformer (not shown) or other similar source as is known. The switching block 40 outputs an electrical pulse that is initially high amperage and then switched to high voltage ("pulse switching"). Preferably, the switching block 40 is controllable by the microprocessor control unit 22. The pulse switching converts the output from a distributor module (not shown) first into a high amperage pulse, i.e., about 13.5 volts DC at 30 amps, and then into a high voltage pulse, i.e., about 50,000-75,000 volts DC at 0.0036 amps, with a total pulse duration of about 200 n-sec. The purpose of the pulse switching is to take full advantage of the plasma-amplifier electrode 36.

When the plasma-amplifier electrode 36 is pulsed with a very fast (about 50 n-sec) high-rise burst of high amperage (a square wave of about 200 n-sec duration), the air fuel mixture is molecularly dissociated into individual radicals and ions in the generated plasma ionization field. The plasma ionization field is persistent even when the source of charge has been terminated. The rate at which the source charge is fully terminated is critical to the effectiveness of the molecular dissociation, so the switching block 40 must convert the plasma ionization field into an ignition field very quickly (in about 50-100 n-sec). While the constituent radicals and individual ions are still in a dissociated plasma state, the introduction of the high voltage ignition source serves to excite the oxidation reaction with extremely high efficiency. This operates without a flame front because the entire field now operates as a single ignition point in the plasma. Thus, the operation of the switched plasma igniter 34 first creates a plasma ionization field and then an ignition field within the span of about 200 n-sec.

Figure 4:
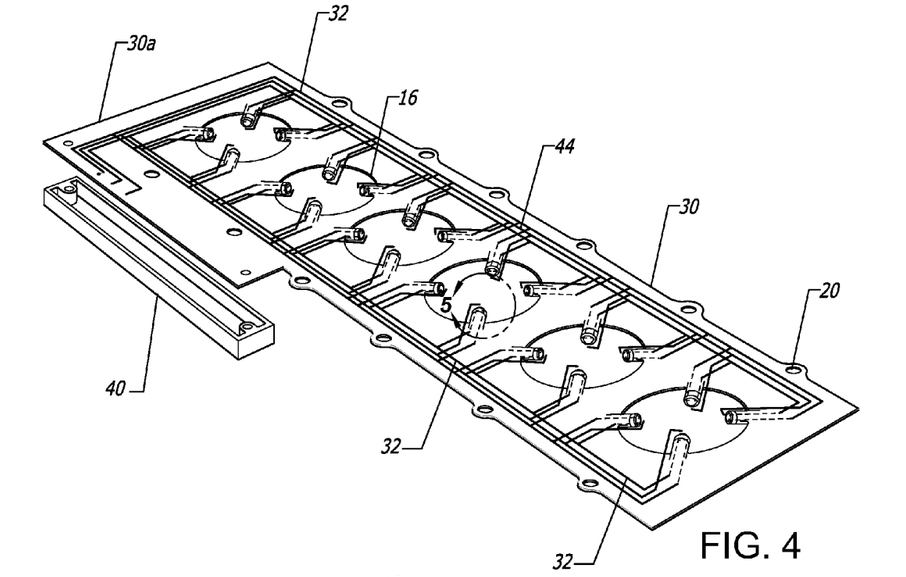
FIG. 4 is a perspective view of one of the laminates with circuit traces of the plasma header gasket of the present invention.
Figure 5:
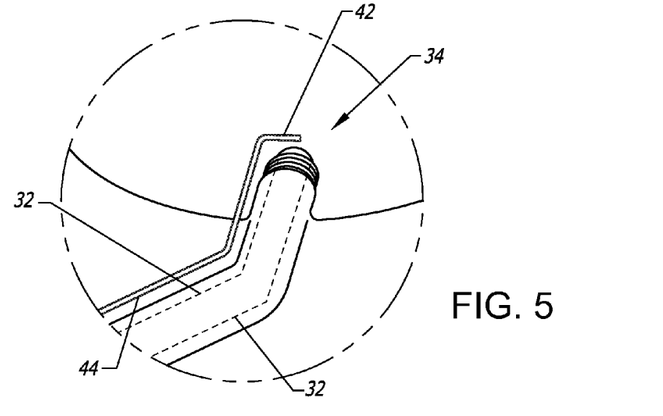
FIG. 5 is a close-up view of FIG. 4 in the area designated by circle 4.

FIGS. 4 and 5 illustrate an alternate embodiment of the lower laminate 30 of the plasma header gasket 10. In this embodiment, the plasma header gasket contains six apertures 16. In the earlier embodiment, the plasma header gasket 10 included four apertures 16. A person skilled in the art will appreciate that the plasma header gasket 10 may be configured with any number of apertures 16 as there may exist piston cylinders 18 in an engine block 12. Thus, a plasma header gasket 10 may be created that has one, two, three, four, six, eight or any number of apertures 16.

One will also observe that each aperture 16 in the plasma header gasket 10 is illustrated with four switched plasma-igniters 34 in each aperture 16. A person skilled in the art will appreciate that the number of switched plasma-igniters 34 associated with any single aperture 16 may include one or more switched plasma-igniters 34 as the size and/or configuration of the engine may allow. When a single aperture 16 includes multiple switched plasma-igniters 34, each of the switched plasma-igniters 34 associated with a particular aperture 16 are preferably conjointly connected, either by a single pair of Thorium-alloy conductors 32 or by multiple pairs of Thorium-alloy conductors 32 to a single terminal in the switching block 40. Alternatively, separate pairs of Thorium-alloy conductors 32 running from a plurality of switched plasma-igniters 34 associated with a single aperture 16 may each be connected to separate terminals in the switching block 40 but are preferably controlled in a coordinated manner by the fully programmable microprocessor control unit 24 so as to form the ionization plasma almost simultaneously in time with the engine piston. In addition, a plurality of switched plasma-igniters 34 associated with a single aperture 16 may be programmed to form the ionization plasma in any predetermined order. For example, the plurality of switched plasma-igniters 34 in a single aperture 16 may be programmed to form the ionization plasma sequentially around the perimeter of the aperture 16 so as to create a plasma vortex in the corresponding piston cylinder 18.

FIGS. 4 and 5 further illustrate a plasma field sensor 42 disposed proximate to the plasma gap 38 of each switched plasma-igniter 34. FIG. 5 shows the switched plasma igniter 34, the half-sphere conductor 36a, the electrically isolated toroidal plasma-emitter ring 36b, plasma gap 38, and plasma field sensor 42 in close-up. The plasma field sensor 42 is connected by a secondary conductor 44 to the switching block 40. The plasma field sensor 42 detects and reports the presence of a plasma ionization field in the piston cylinder 18. The sensor 42 can detect the electron density and other properties of the plasma field. Upon receiving this information, the microprocessor control unit 24 can be programmed to modulate the combustion properties by under or over compensating for the plasma ionization field generated by each plasma amplifier electrode 36 as described further below. There is preferably at least one plasma field sensor 42 per aperture 16. Other sensors may also be included such as a temperature sensor and/or a pressure sensor to measure the temperature or pressure in a particular piston cylinder 18. The microprocessor control unit 24 is configured to pick up data from all of these environmental sensors. The microprocessor control unit 24 may also have a connection to the tachometer sensor so that it knows the RPMs of the engine.

Figure 6:
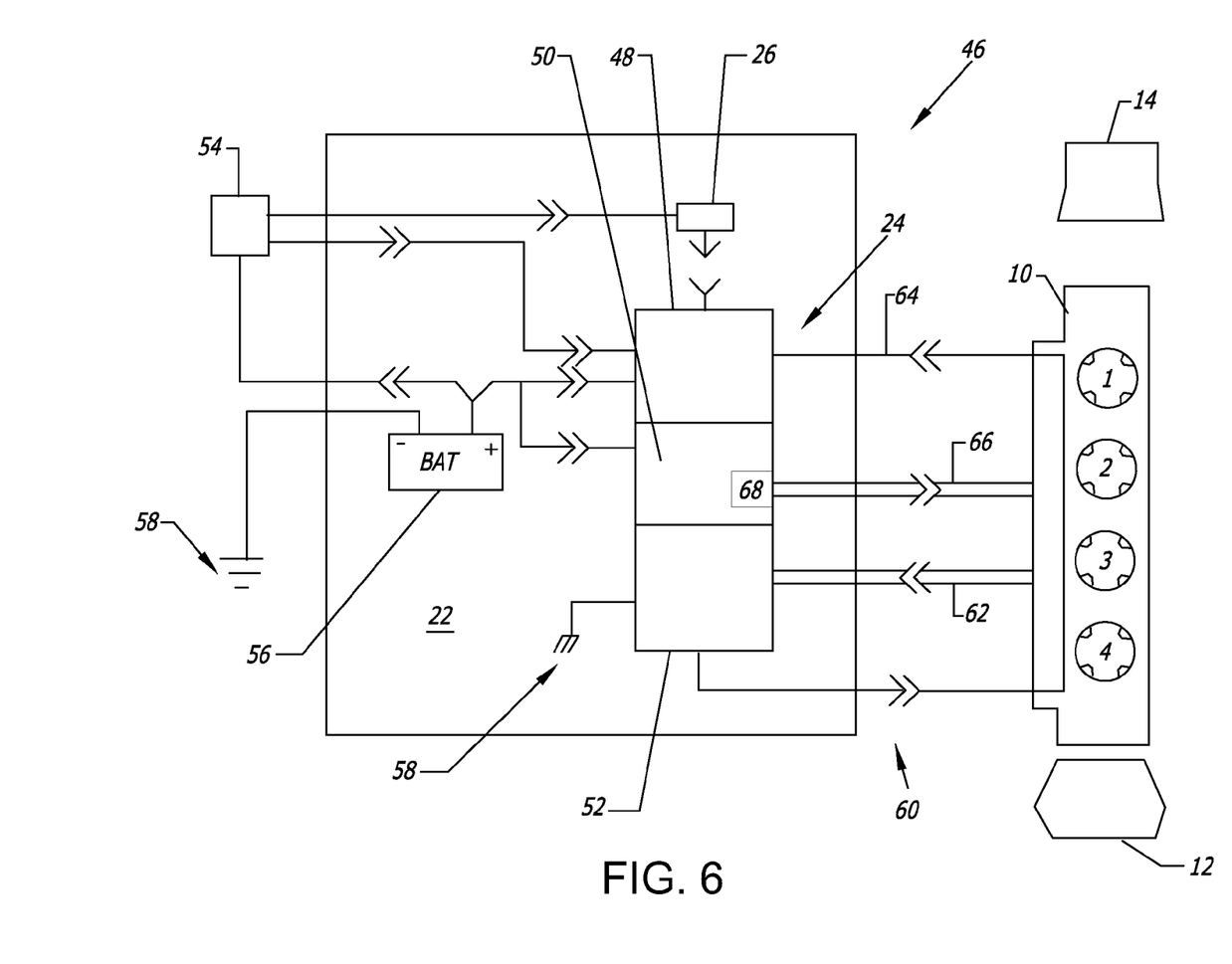
FIG. 6 is a schematic illustration of the inventive plasma header gasket system of the present invention.
Figure 7:
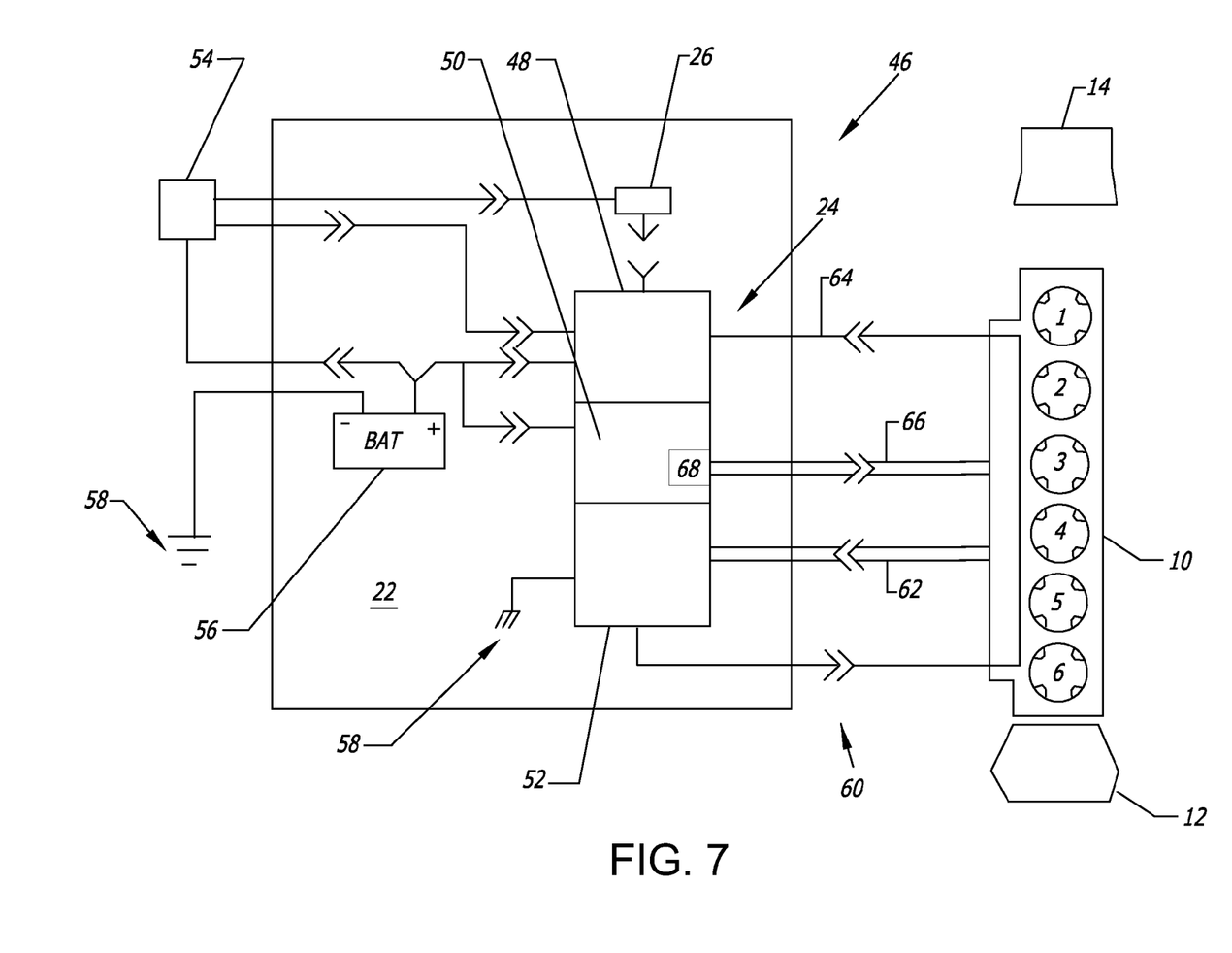
FIG. 7 is a schematic illustration of the inventive plasma header gasket system of the present invention.

FIG. 6 schematically illustrates a system 46 incorporating the inventive plasma header gasket 10 having four cylinder apertures. As illustrated, the system 46 may be designed for an engine having varying numbers of piston cylinders. FIG. 7 alternately illustrates the system 46 with an engine block 12 having either six cylinders and corresponding engine headers 14. The plasma header gasket 10 will have a corresponding number of apertures 16 depending on the number of cylinders 18 in the engine block 12. These alternate plasma header gasket 10 embodiments have similar connections to the remainder of the system 46.

The system 46 includes the microprocessor control unit 24 mounted on or near the firewall 22 of the engine compartment. The microprocessor control unit preferably includes a dynamic engine control unit (ECU) module 48, a dynamic ignition (IGN) module 50 and an alternate fuel processor 52. The system 46 may be installed as the ignition system in a new engine, in a retrofit to work in parallel with an existing ignition system, or in a retrofit as a complete replacement of an existing ignition system.

In the case of a retrofit into an existing engine, the microprocessor control unit 24 is wired into the existing ignition system including the OEM ECU 54, the ignition coil 26, the battery 56, and appropriate electrical grounds 58. In such a retrofit system, the dynamic ECU module 48 and dynamic IGN module 50 are programmed to work with the existing OEM ECU 54 and ignition coil 26 so as to ignite the switched plasma-igniters 34 on the plasma header gasket 10 in time with the existing ignition source, e.g., spark plugs or compression. The intention of this configuration is to improve upon the efficiency of the combustion occurring in the piston cylinders 18.

The microprocessor control unit 24 receives sensor data from the plasma header gasket 10 through its electrical connections 60 therewith. The electrical connections 60 include a data connection 62 whereby the microprocessor control unit 24 receives plasma field, temperature, pressure and/or other parameter data that may be measured by the plasma header gasket 10 and its various sensors. An RPM connection 64 receives data from an existing tachometer sensor in the engine to assist the microprocessor control unit 24 in timing the formation of the ionization plasma by the switched plasma-igniters 34 with the engine timing. A plasma connection 66 provides the electrical conductivity to the switching block 40 which is in turn passed through the pairs of Thorium-alloy conductors 32 to the switched plasma-igniters 34.

This plasma connection 66 passes on a high voltage current from the microprocessor control unit 24. The high voltage current is configured to produce a plasma ionization field in the plasma gap 38 of the switched plasma-igniters 34. Prior art ignition systems typically produced sparks on the order of fifteen milliamps in the case of a generic ignition system or thirty milliamps in the case of a multiple spark discharge ignition system. The plasma header gasket system 46 of the present invention is configured to produce plasma ionization fields having a current on the order of two hundred amperes per discharge—over ten thousand times the current of a typical prior art spark ignition system. The dynamic IGN module 50 includes a plasma power module 68 which includes plasma circuitry designed to step up the current supplied by the ignition system 46 and produce the larger plasma ionization field resulting in increased combustion efficiency.

As described above, the plasma field sensor 42 detects the presence of the plasma ignition field in front of the plasma gap 38 in the piston cylinder 18. The plasma field sensor 42 transmits the signal via the secondary conductor 44 and the data connection 62 to the microprocessor control unit 24. The microprocessor control unit 24 can adjust the output of the plasma power module 68 to either over or under compensate for the discharge current in the switched plasma-igniters 34 to either increase or decrease the size of the plasma ignition field in the piston cylinder 18.

As previously suggested, the inventive system 46 may be installed on any type of fuel burning internal combustion engine, i.e., gasoline or diesel, or any other engine requiring combustion of fuel. If installed on a gasoline engine, the system 46 can use the existing distributor and ignition coil 26 for the established firing order of the pistons. If installed on a diesel engine, the system 46 simulates the firing order by preprogramming the same into the microprocessor control unit 24. Ignition parameters such as dwell timing can be programmed in to the microprocessor control unit 24. Such programming allows for a simulated firing order without an existing distributor or rotor tied into the system 46.

With the addition of the plasma header gasket system 46, a diesel engine can be configured to burn other types of fuel requiring an ignition for combustion versus compression for combustion. The alternate fuel processor 52 can be programmed with the parameters necessary to initiate combustion with these other types of fuels. The plasma header gasket system 46 may also produce a plasma ionization field having sufficient temperature to more fully combust diesel fuel on top of the combustion initiated by compression. The thickness of the plasma header gasket 10 may be adjusted to modify the compression ratio in various engines. In the case of an engine with existing spark plugs, the plasma header gasket 10 may be installed in parallel with the existing spark plugs or in replacement of the existing spark plugs. The plasma header gasket 10 may also be installed on an existing engine without removing the same from the engine compartment. It may only be necessary to remove and/or replace the engine header 14 during installation of the plasma header gasket 10.

The addition of the switched plasma-igniters 34 on the plasma header gasket 10 introduces additional ignition sources that produce a cleaner burn in the piston cylinder 18. This cleaner burn dramatically reduces harmful emissions resulting from combustion. This improvement is particularly important for two-stroke engines such as lawnmowers, leaf blowers, outboard motors and motorcycles. The cleaner burn also drastically reduces particulates from combustion that are passed through the exhaust system.

Although several embodiments have been described in detail for purposes of illustration, various modifications may be made without departing from the scope and spirit of the invention. Accordingly, the invention is not to be limited, except as by the appended claims.

What is claimed is:

1. A plasma header gasket, comprising:
   a substrate having an aperture, wherein the aperture corresponds to a piston cylinder in an engine block;
   a plurality of Thorium-alloy conductors associated with the substrate; and
   a switched plasma-igniter electrically connected to the Thorium-alloy conductors, the switched plasma-igniter having a plasma-amplifier electrode disposed in the aperture, the plasma-amplifier electrode comprising a half-sphere conductor surrounded by and electrically isolated from a toroidal plasma emitter ring defining a plasma gap therebetween.

2. The plasma header gasket of claim 1, wherein the substrate comprises dielectric layers, and wherein the Thorium-alloy conductors comprise electrically conductive Thorium-alloy circuit traces disposed between the dielectric layers.

3. The plasma header gasket of claim 1, further comprising a switching block electrically connected to the Thorium-alloy conductors.

4. The plasma header gasket of claim 3, wherein the Thorium-alloy circuit traces electrically connect the switched plasma-igniter to the switching block.

5. The plasma header gasket of claim 3, further comprising a plasma field sensor associated with the aperture and electrically connected to the switching block by a secondary conductor associated with the substrate.

6. The plasma header gasket of claim 3, comprising a plurality of pairs of Thorium-alloy conductors associated with the substrate and electrically connected to the switching block.

7. The plasma header gasket of claim 6, comprising a plurality of switched plasma-igniters each electrically connected to a respective one of the plurality of pairs of Thorium-alloy conductors, each of the plurality of switched plasma-igniters having a plasma-amplifier electrode disposed within or adjacent to the aperture, each plasma-amplifier electrode comprising a half-sphere conductor surrounded by and electrically isolated from a toroidal plasma emitter ring defining a plasma gap therebetween.

8. The plasma header gasket of claim 6, wherein the substrate has a plurality of apertures corresponding to a plurality of piston cylinders in the engine block.

9. The plasma header gasket of claim 8, comprising a plurality of switched plasma-igniters each electrically connected to a respective one of the plurality of pairs of Thorium-alloy conductors, each of the plurality of switched plasma-igniters having a plasma-amplifier electrode disposed in the aperture, each plasma-amplifier electrode comprising a half-sphere conductor surrounded by and electrically isolated from a toroidal plasma emitter ring defining a plasma gap therebetween.

10. The plasma header gasket of claim 9, wherein each of the plurality of switched plasma-igniters are conjointly electrically connected to a respective one of the plurality of pairs of Thorium-alloy conductors.

11. A plasma header gasket system, comprising: a substrate having an aperture corresponding to a piston cylinder in an engine block;
Thorium-alloy conductors associated with the substrate;
a switched plasma-igniter electrically connected to the Thorium-alloy conductors, the switched plasma-igniter having a plasma-amplifier electrode disposed in the aperture, the plasma-amplifier electrode comprising a half-sphere conductor surrounded by and electrically isolated from a toroidal plasma emitter ring defining a plasma gap therebetween;
a switching block disposed on the substrate and electrically connected to the Thorium-alloy conductors;
a microprocessor control unit electrically connected to the switching block, wherein the microprocessor control unit is programmed to ignite the switched plasma-igniter in time with a piston in the piston cylinder; and
a plasma amplifier electrically connected to the switched plasma-igniter and controllable by the microprocessor control unit, wherein the plasma amplifier produces a plasma ionization field through the switched plasma-igniter when the microprocessor control unit sparks the switched plasma-igniter.

12. The plasma header gasket system of claim 11, wherein the substrate comprises dielectric layers, and wherein the pair of Thorium-alloy conductors comprises electrically conductive Thorium-alloy circuit traces laminated between the dielectric layers.

13. The plasma header gasket system of claim 12, wherein the Thorium-alloy circuit traces electrically connect the switched plasma-igniter to the switching block.

14. The plasma header gasket system of claim 11, further comprising
a plasma field sensor associated with the aperture and electrically connected to the switching block.

15. The plasma header gasket system of claim 11, comprising a plurality of pairs of Thorium-alloy conductors associated with the substrate and electrically connected to the switching block.

16. The plasma header gasket system of claim 15, comprising a plurality of switched plasma-igniters each electrically connected to a respective one of the plurality of pairs of Thorium-alloy conductors, each of the plurality of switched plasma-igniters having a plasma-amplifier electrode disposed in a respective one of the apertures, each plasma-amplifier electrode comprising a half-sphere conductor surrounded by and electrically isolated from a toroidal plasma emitter ring defining a plasma gap therebetween.

17. The plasma header gasket system of claim 15, wherein the substrate has a plurality of apertures, each aperture corresponding to one of a plurality of piston cylinders in the engine block.

18. The plasma header gasket system of claim 17, comprising a plurality of switched plasma-igniters each electrically connected to one of the plurality of pairs of Thorium-alloy conductors, each of the plurality of switched plasma-igniters having a plasma-amplifier electrode disposed in one of the plurality of apertures, each plasma-amplifier electrode comprising a half-sphere conductor surrounded by and electrically isolated from a toroidal plasma emitter ring defining a plasma gap therebetween.

19. The plasma header gasket system of claim 18, wherein each of the plurality of switched plasma-igniters are conjointly electrically connected to a respective one of the plurality of pairs of Thorium-alloy conductors.

20. The plasma header gasket system of claim 19, wherein the microprocessor control unit is programmed to ignite the plurality of switched plasma-igniters sequentially around a particular aperture so as to create a plasma vortex in the corresponding piston cylinder.

* * * * *